US009269203B2

(12) United States Patent
Peirce (10) Patent No.: US 9,269,203 B2
(45) Date of Patent: Feb. 23, 2016

(54) VEHICLE COMPONENT IDENTIFICATION AND CONFIGURATION REGISTRY REPORTING SYSTEM

(71) Applicant: GENERAL MOTORS LLC, Detroit, MI (US)

(72) Inventor: Kenneth L. Peirce, Grosse Pointe Farms, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 0 days.

(21) Appl. No.: 14/502,564

(22) Filed: Sep. 30, 2014

(65) Prior Publication Data

US 2015/0019068 A1 Jan. 15, 2015

Related U.S. Application Data

(63) Continuation of application No. 13/109,403, filed on May 17, 2011.

(51) Int. Cl.
*G07C 5/00* (2006.01)
*H04L 29/08* (2006.01)
*G07C 5/08* (2006.01)
*H04L 29/14* (2006.01)

(52) U.S. Cl.
CPC ............. *G07C 5/008* (2013.01); *G07C 5/085* (2013.01); *H04L 67/125* (2013.01); *H04L 69/40* (2013.01)

(58) Field of Classification Search
CPC ..... H04W 12/06; H04W 12/02; H04W 24/00; H04L 63/08; H04L 67/125; H04L 69/40; G07C 5/085; G07C 5/008
See application file for complete search history.

(56) References Cited

U.S. PATENT DOCUMENTS

| | | | |
|---|---|---|---|
| 5,394,327 A | 2/1995 | Simon, Jr. et al. | |
| 6,052,631 A * | 4/2000 | Busch et al. | ................ 701/29.6 |
| 6,438,481 B1 | 8/2002 | Carpenter et al. | |
| 7,123,879 B2 | 10/2006 | Koketsu et al. | |
| 7,606,587 B2 | 10/2009 | Xu et al. | |
| 8,271,703 B2 | 9/2012 | Wang et al. | |
| 2002/0154777 A1 | 10/2002 | Candelore | |
| 2005/0275515 A1* | 12/2005 | Morris | .......................... 340/438 |
| 2008/0071882 A1 | 3/2008 | Hering et al. | |
| 2008/0148409 A1 | 6/2008 | Ampunan et al. | |
| 2009/0249074 A1 | 10/2009 | Madhavan et al. | |
| 2009/0323967 A1* | 12/2009 | Peirce et al. | .................. 380/278 |
| 2010/0202616 A1 | 8/2010 | Peirce et al. | |

* cited by examiner

*Primary Examiner* — Marisol Figueroa
(74) *Attorney, Agent, or Firm* — Leydig, Voit & Mayer, Ltd.

(57) ABSTRACT

A method and system for utilizing a telematics unit on a telematics-equipped vehicle as a register for ECU Critical Information (ECI) associated with the ECUs in the vehicle, which may include their serial numbers, configurations, software images, and other data includes the telematics unit querying ECUs within the telematics-equipped vehicle such as, for example, when the vehicle is started. The ECUs may then provide the telematics unit with the ECI associated with each ECU. The ECI may be encrypted, and the telematics unit may provide each module that it queries with a nonce used in the encryption process. The telematics unit may then decrypt the ECI received from each of the ECUs and compare the received ECI to previously stored ECI. If the received ECI is different from the previously stored ECI, the telematics unit may send the new ECI to a TSP call center. Both the telematics unit and the call center may replace the previously stored ECI with the new ECI and may maintain records of previously stored ECI and updates to the ECI.

17 Claims, 5 Drawing Sheets

VEHICLE COMPONENT IDENTIFICATION AND CONFIGURATION REGISTRY REPORTING SYSTEM

CROSS-REFERENCE TO RELATED APPLICATIONS

This patent application is a continuation of copending U.S. patent application Ser. No. 13/109,403, filed May 17, 2011, which is incorporated by reference herein in its entirety.

BACKGROUND

Manufacturers and owners of conventional mobile vehicles such as cars, trucks, motorcycles, and so on face many certain problems associated with the security of the mobile vehicle. In particular, one problem associated with mobile vehicles has traditionally been theft. Stolen vehicles can be hard to locate, and when stolen vehicles are disassembled and sold for parts, it may become even more difficult to track down the parts and identify the parties responsible for stealing or processing the vehicle. The sale of stolen vehicle parts is a problem for manufacturers as well, as it introduces illicit competition from used and worn parts, and harms the industry and consumers generally.

In addition to the problem of theft, manufacturers may encounter warranty issues with owners who may tamper with certain components of the vehicle. For example, an owner or professional "tuner shop" may reprogram the electric control unit (ECU) responsible for the vehicle engine with performance mappings that increase the engine performance ("tuner updates"). However this "tuning" also results in a greatly shortened engine life. Once the engine breaks, the ECU will be re-programmed with the original settings so that the manufacturer cannot determine that the warranty is no longer valid due to "tuner" tampering.

The inventors observe that telematics units within telematics-equipped mobile vehicles may control and monitor various components of the vehicles, as well as provide subscribers with connectivity to a telematics service provider (TSP). The TSP provides the subscriber with an array of services ranging from emergency call handling and stolen vehicle recovery to diagnostics monitoring and turn-by-turn navigation. Telematics units are often provisioned and activated at a point of sale when a subscriber purchases a telematics-equipped vehicle. Upon activation, the telematics unit can be utilized to provide a subscriber with telematics services.

It is an object in part of certain implementations of the present invention to utilize the telematics unit on mobile vehicles to address the problems of tampering and theft. However, while this is an object underlying certain implementations of the invention, it will be appreciated that the invention is not limited to systems that solve the problems noted herein. Moreover, the inventors have created the above body of information for the convenience of the reader and expressly disclaim all of the foregoing as prior art; the foregoing is a discussion of problems discovered and/or appreciated by the inventors, and is not an attempt to review or catalog the prior art.

SUMMARY

The invention provides a system and method for utilizing a telematics unit on a telematics-equipped vehicle as a register for ECU Critical Information (ECI) associated with the ECUs in the vehicle, which may include their serial numbers, configurations, software images, and other data. In one implementation, the telematics unit may query ECUs within the telematics-equipped vehicle at some point in time, such as, for example, when the vehicle is started, and the ECUs may then provide the telematics unit with the ECI associated with each ECU.

In a further implementation, the telematics unit may provide each module that it queries with a nonce (random number used once), which may be, for example, GPRS (General Packet Radio Service) or GPS (Global Positioning System) time, and the ECUs may each send a micro-certificate, encrypted ECI (nonce used in encryption key generation), and a signature of the ECI to the telematics unit. The telematics unit may then decrypt the ECI received from each of the ECUs.

The telematics unit may then compare the micro-certificate and ECI received from the ECUs to previously stored micro-certificates and ECI. If either the received micro-certificate or ECI are different from the previously stored micro-certificate or ECI, the telematics unit may send the new micro-certificate and/or ECI to a TSP call center. Both the telematics unit and the call center may replace the previously stored micro-certificate and/or ECI with the new micro-certificate and/or ECI and may maintain records of previously stored micro-certificate and/or ECI that have since been changed. In yet another further implementation, the ECI and/or the communication between the telematics unit and the TSP call center may be cryptographically protected using micro-certificates or standard x.509 certificates.

Other objects and advantages of the invention will become apparent upon reading the following detailed description and upon reference to the drawings.

DETAILED DESCRIPTION

Before discussing the details of the invention and the environment wherein the invention may be used, a brief overview is given to guide the reader. In general terms, not intended to limit the claims, the invention is directed to a system and method for utilizing a telematics unit on a telematics-equipped vehicle as a register for ECI associated with the ECUs in the vehicle. The telematics unit may query ECUs within the telematics-equipped vehicle at some point in time, and the ECUs may then provide the telematics unit with the ECI associated with each ECU. Each telematic unit may compare any received ECI to a previously stored ECI for a given ECU, and if the received ECI is different from the previously stored ECI, the telematics unit may send the new ECI to a TSP call center. Both the telematics unit and the call center may replace the previously stored ECI with the new ECI and may maintain records of previously stored ECI and updates to the ECI.

Figure 1:
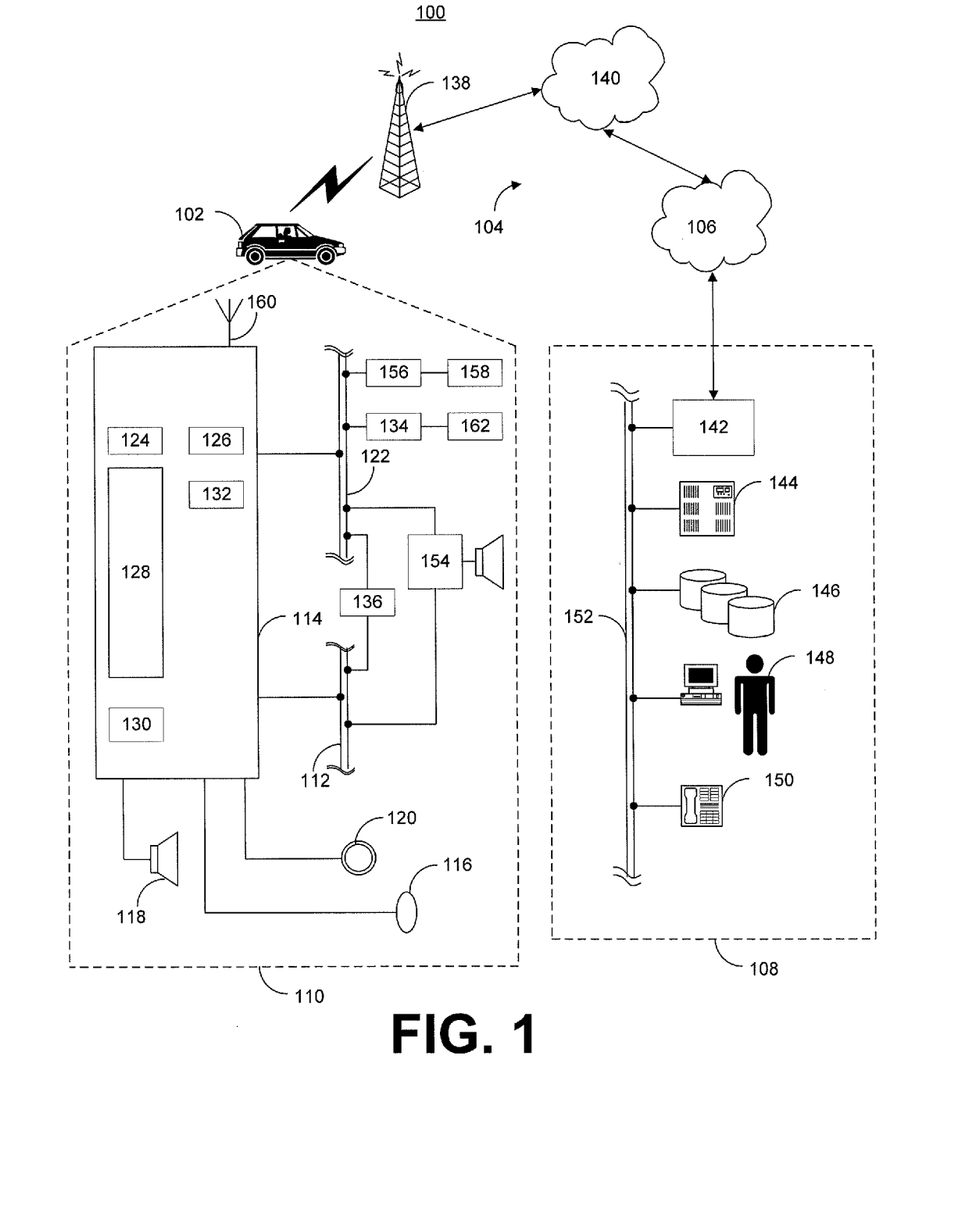
FIG. 1 is a schematic diagram of an operating environment for a mobile vehicle communication system usable in implementations of the described principles.

Given this overview, an exemplary environment in which the invention may operate is described hereinafter. It will be appreciated that the described environment is an example, and does not imply any limitation regarding the use of other environments to practice the invention. With reference to FIG. 1 there is shown an example of a communication system 100 that may be used with the present method and system and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) of the telematics unit 114.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include powertrain control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 144.

As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Operations Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

It will be appreciated that the components depicted in FIG. 1, as well as other modules that may be included in a vehicle but are not depicted in FIG. 1, may include or be connected to appropriate ECUs, which are, generally speaking, control units that control one or more of the systems or subsystems in the vehicle. The telematics unit 114 may communicate with the ECUs, including, for example, sending queries to the ECUs and receiving ECI from the ECUs, and the telematics unit 114 may be connected to the ECUs through wired or wireless connections. Examples of types of ECUs include and are not limited to, airbag control units, convenience control units, door control units, engine control units, man machine interfaces, on-board diagnostics units, powertrain control modules, seat control units, speed control units, telephone control units, and transmission control units.

Figure 2:
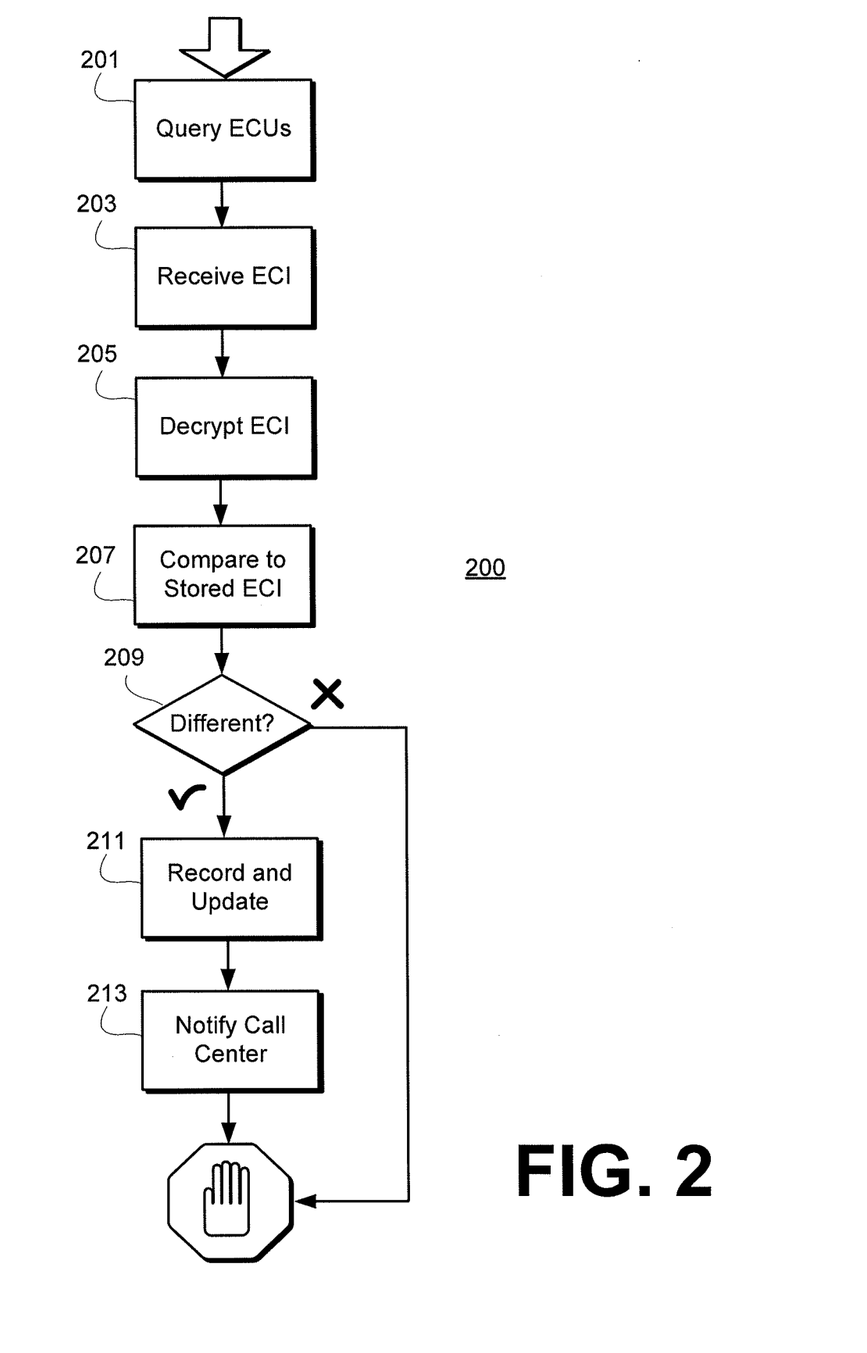
FIG. 2 is a flowchart illustrating a process for using a telematics unit on a telematics-equipped vehicle as a register for ECI and detecting changes in ECI in accordance with an implementation of the described principles.

With further reference to the architecture of FIG. 1, and turning more specifically to FIG. 2, a process 200 for using a telematics unit on a telematics-equipped vehicle as a register for ECI and detecting changes in ECI is depicted. At some point in time, such as when a telematics-equipped vehicle is started, the telematics unit may send a query 201 to ECUs within the vehicle, and the ECUs may respond 203 with ECI (including but not limited to serial numbers, configurations, software images, and other data). In a further implementation the ECI received from an ECU may be encrypted, and the telematics unit may then decrypt 205 the ECI, which will be discussed in further detail below.

The telematics unit may then compare 207 the ECI received in response to the query to previously stored ECI. If any of the ECI is different 209 from the previously stored ECI, the telematics unit may update 211 its previously stored ECI with the new ECI, and may further maintain a record 211 of previously stored ECIs and updates made to them. The telematics unit may further send 213 the new ECI that is different from the previously stored ECI to a TSP call center, and the TSP call center may also update its previously stored ECI at the call center with the new ECI, and may also maintain a record of previously stored ECI and updates made to them for each vehicle. Based on the change from the previously stored ECI to the new ECI received from the telematics unit, the call center may or may not take further appropriate action, depending on the information, as will be discussed in further detail below.

It will be appreciated by those of skill in the art that the execution of the various machine-implemented processes and steps described herein may occur via the computerized execution of computer-executable instructions stored on a non-transient, tangible computer-readable medium, e.g., RAM, ROM, PROM, volatile, nonvolatile, or other electronic memory mechanism. Thus, for example, the operations performed by the telematics unit and the ECUs may be carried out according to stored instructions or applications installed on the telematics unit and the ECUs.

Figure 3:
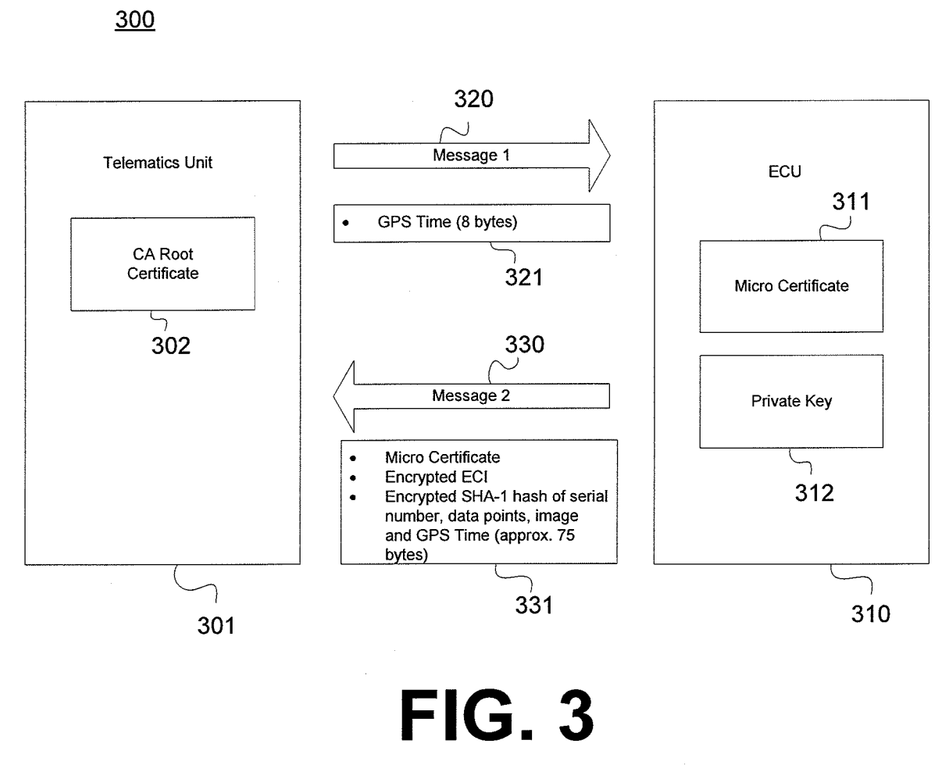
FIG. 3 is a schematic illustrating communications between a telematics unit and an ECU in accordance with an implementation of the described principles.

With further reference to the architecture of FIG. 1 and the process of FIG. 2, and turning now more specifically to FIG. 3, a schematic 300 is depicted that illustrates exemplary communications between a telematics unit 301 and an ECU 310 in one implementation where the ECI is encrypted. The telematics unit 301, which has a Certification Authority (CA) Root Certificate 302 stored on it, may send a first message 320 (e.g. a query) to the ECU 310, wherein the query includes a nonce, which, for example, may be the GPS time 321 or GPRS time. The ECU 310, which has a micro-certificate 311, and private key 312, may reply to the first message 320 with a second message 330. A micro-certificate, such as an implicit certificate used in Elliptical Curve Cryptography, may be used to secure communications while occupying less data than other encryption techniques. The micro-certificate may include an identifier associated with an entity, as well as a public key certificate and digital signature superimposed upon one another.

The second message 330 may include the micro-certificate, encrypted ECI, and an encrypted SHA-1 (Secure Hash Algorithm-1) hash based on the ECI and nonce 331. The encrypted ECI and the encrypted SHA-1 hash may be encrypted by the private key 312 from the ECU. The telematics unit 301 may obtain a public key from the micro-certificate and use the public key to decrypt the encrypted ECI and encrypted SHA-1 hash. The telematics unit 301 may further perform a hash function on the decrypted ECI and the previously sent nonce, which allows the telematics unit 301 to verify that the ECI has not been altered.

In a further implementation, the telematics unit and the call center may communicate over a secure connection as well, permitting the reporting of ECI to the call center by the telematics unit with privacy and a high degree of confidence in the validity of the reporting. Implementation of a secure connection between the telematics unit and the call center using micro-certificates may be achieved by storing a private key at the telematics unit and providing the corresponding public key to the call center (e.g. by sending a micro-certificate including the telematics unit's public key to the call center from the telematics unit or from a CA).

Then, the telematics unit may receive a micro-certificate including the call center's public key (e.g. from the call center or from a CA). After extracting the public key from the micro-certificate, the telematics unit may encrypt any information to be sent to the call center using the call center's public key. The telematics unit may further perform a second encryption using the telematics unit's private key.

The encrypted information may then be sent to the call center, and the call center may decrypt it using the telematics unit's public key and the call center's private key. Through this process, the call center is able to ensure the confidentiality of the communication and verify the identity of the telematics unit.

The use of micro-certificates in secure communications is discussed in further detail in U.S. Pub. No. 2010/0202616, which is incorporated herein by reference in its entirety. One skilled in the art will appreciate that other types and variations of cryptographic schemes may be used to protect the exchanges between the telematics unit and the ECU and between the telematics unit and the call center, and that the present invention is not limited to the exemplary cryptographic exchanges described above.

Figure 4:
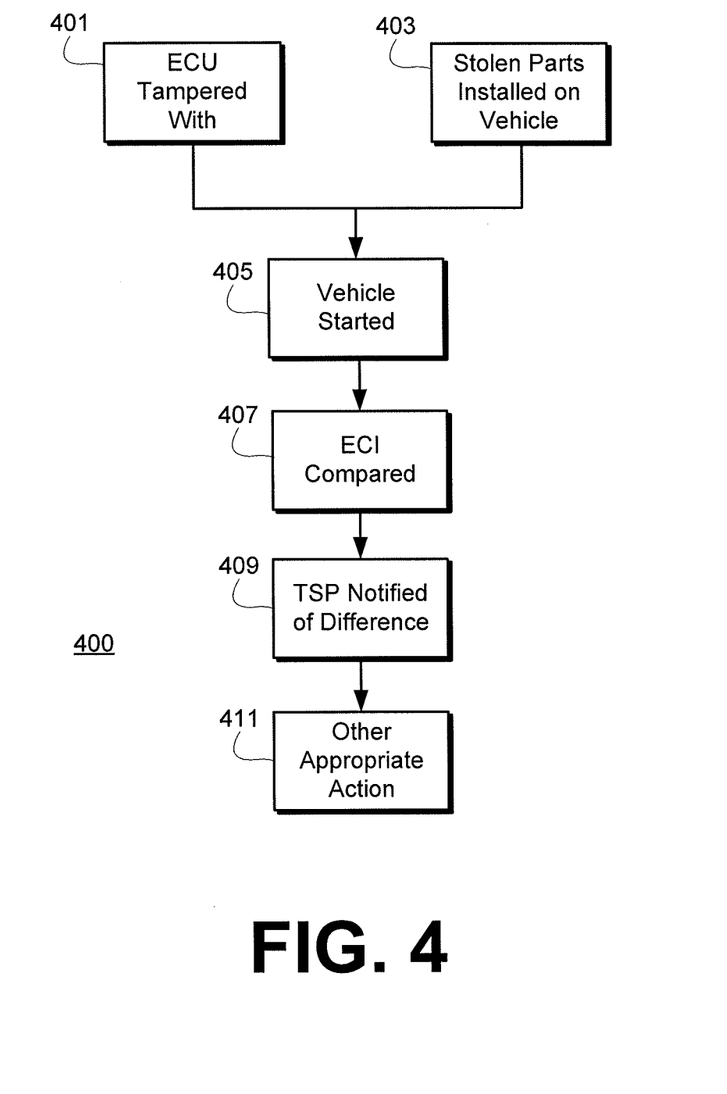
FIG. 4 is a flowchart illustrating two exemplary processes relating to tampered-with ECUs and stolen ECUs in accordance with an implementation of the described principles.

Turning now to FIG. 4, a process 400 is depicted illustrating two examples wherein an implementation of the described principles would produce advantageous results in connection with tampered-with or stolen ECUs. Given a situation where an ECU in a telematics-equipped vehicle has been tampered with 401 or a situation where an ECU was extracted from a stolen vehicle and installed into a telematics-equipped vehicle 403, when the vehicle is started 405, the telematics unit may query the ECUs of the vehicle as described above with respect to FIG. 2. Upon querying the ECUs and comparing the received ECI with the previously stored ECI 407, the telematics unit would determine that the ECI has changed for both a vehicle that has been tampered with and a vehicle that was newly installed with a stolen ECU.

The telematics unit could then notify the TSP of this difference 409, and the TSP may take appropriate action in response 411. For example, if the ECU has been tampered with, the TSP may notify the manufacturer such that the manufacturer may investigate whether there was a breach of warranty, and the TSP may also notify the user of the vehicle through the telematics unit that an ECU has been tampered with. If the ECU came from a stolen vehicle, the TSP may be able to determine that it came from a stolen vehicle based on the TSP's records of the ECUs associated with vehicles reported as stolen. The TSP may further notify the proper authorities, which may lead to discovery of a "chop shop" selling many stolen parts or other useful information.

Figure 5:
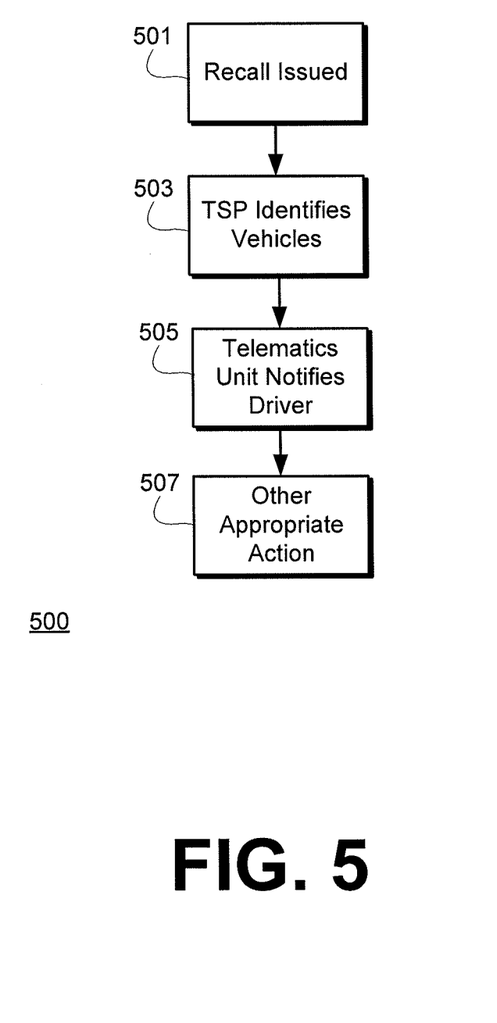
FIG. 5 is a flowchart illustrating an exemplary process relating to an issued recall in accordance with an implementation of the described principles.

Turning now to FIG. 5, a process 500 is depicted illustrating an exemplary situation wherein an implementation of the described principles would produce advantageous results in connection with a recall. Given a situation where a manufacturer realizes that a type of ECU or component connected with a type of ECU on a group of telematics-equipped vehicles is defective and issues a recall on those vehicles 501, a TSP may identify 503 all the telematics-equipped vehicles in that group that contain the defective component.

The TSP may perform the identification by checking its own records of ECI and may broadcast a message to telematics-equipped vehicles containing the defective component notifying them of the recall. The telematics unit may then further notify 505 a user of the vehicle of the recall, and may take further action 507 as appropriate. For example, if the defect is very serious, the telematics unit may goes as far as rendering the vehicle inoperable to protect the safety of users of the vehicle.

In an alternative implementation, the bad software does not touch the certificate on installation and the software is modified to always employ the legitimate (previous) image's known hash (prior to adding nonce) to the hash along with the querying telematics unit's latest nonce. This "faked" hash is then provided to the querying telematics unit to defeat a tuner with sophisticated capabilities. Two capabilities are needed in this alternative implementation: 1. The ECU can permit another ECU, like the telematics unit, to read it's program memory directly (or indirectly if interface CPU's software is inviolable.) 2. Upon performing a SHA 1 Hash on the software in the ECU's FLASH, the telematics unit can use it's certificate to generate a signature and compare it to a previously calculated signature for the same ECU. The rest of the reporting logic is the same in this implementation.

It will be appreciated that the described system and method allow for utilizing a telematics unit on a telematics-equipped vehicle as a register for ECI associated with the ECUs in the vehicle. It will also be appreciated, however, that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system for registering electronic control unit (ECU) critical information, comprising:
a plurality of telematics-equipped vehicles, each telematics-equipped vehicle comprising a telematics unit configured to communicate with an ECU of the respective telematics-equipped vehicle to obtain ECU critical information (ECI) corresponding to the ECU, and to transmit the ECI to a telematics service provider (TSP) call center, wherein the ECI obtained by each telematics unit is encrypted, and wherein each telematics unit is further configured to verify the integrity of the obtained encrypted ECI by:
obtaining an encrypted hash function result corresponding to contents of the encrypted ECI obtained by the telematics unit,
decrypting the obtained encrypted ECI,
performing a hash function on the decrypted ECI to obtain a hash function result corresponding to the decrypted ECI,
decrypting the obtained encrypted hash function result, and
comparing the hash function result corresponding to the decrypted ECI with the decrypted obtained hash function result; and
the TSP call center, configured to receive ECI from the plurality of telematics-equipped vehicles and to identify stolen vehicles and to issue targeted recall notifications based on the received ECI;
wherein the TSP call center identifying stolen vehicles comprises: comparing received ECI with ECI corresponding to ECUs reported as stolen to determine whether the ECI received from a telematics-equipped vehicle matches the ECI corresponding to an ECU reported as stolen; and
wherein the TSP call center issuing targeted recall notifications comprises: identifying a defective ECU for which a recall notification is to be issued; identifying telematics-equipped vehicles of the plurality of telematics-equipped vehicles with the defective ECU installed based on the received ECI; and transmitting a recall notification to the identified telematics-equipped vehicles.

2. The system according to claim 1, wherein identifying telematics-equipped vehicles of the plurality of telematics-equipped vehicles with the defective ECU installed further includes identification of telematics-equipped vehicles that have previously had the defective ECU installed thereon based on the received ECI.

3. The system according to claim 1, wherein transmission of the ECI to the TSP call center by the telematics units is triggered by the telematics-equipped vehicle detecting a change in ECI of an ECU of the telematics-equipped vehicle.

4. The system according to claim 1, wherein the telematics unit obtaining the ECI is triggered by the telematics-equipped vehicle being started.

5. The system according to claim 1, wherein transmission of the ECI to the TSP call center by the telematics units is encrypted.

6. The system according to claim 5, wherein the TSP call center has a public and private key pair associated therewith, and the telematics units are configured to encrypt ECI to be transmitted using the public key of the pair, and the TSP call center is configured to decrypt transmitted ECI using the private key of the pair.

7. The system according to claim 1, wherein the obtained ECI corresponds to an ECU serial number.

8. The system according to claim 1, wherein the obtained ECI corresponds to ECU configuration data.

9. The system according to claim 1, wherein the obtained ECI corresponds to an ECU software image.

10. A non-transitory computer-readable medium having processor-executable instructions stored thereon for registering electronic control unit (ECU) critical information of a telematics-equipped vehicle with a telematics service provider (TSP) call center, the processor-executable instructions, when executed by a processor, facilitating performance of the following:
communicating, by a telematics unit, with an ECU of the telematics-equipped vehicle to obtain ECU critical information (ECI) corresponding to the ECU, wherein the ECI obtained by each telematics unit is encrypted;
verifying, by the telematics unit, the integrity of the obtained encrypted ECI, wherein the verifying further comprises:
obtaining an encrypted hash function result corresponding to contents of the encrypted ECI obtained by the telematics unit,
decrypting the obtained encrypted ECI,
performing a hash function on the decrypted ECI to obtain a hash function result corresponding to the decrypted ECI,
decrypting the obtained encrypted hash function result, and
comparing the hash function result corresponding to the decrypted ECI with the decrypted obtained hash function result; and
transmitting, by the telematics unit, the ECI to the TSP call center to facilitate stolen vehicle identification and targeted recall notifications by the TSP call center.

11. The non-transitory computer-readable medium according to claim 10, wherein transmission of the ECI to the TSP call center is triggered by the telematics-equipped vehicle detecting a change in ECI of an ECU of the telematics-equipped vehicle.

12. The non-transitory computer-readable medium according to claim 10, wherein the telematics units obtaining the ECI is triggered by the telematics-equipped vehicle being started.

13. The non-transitory computer-readable medium according to claim 10, wherein transmission of the ECI to the TSP call center is encrypted.

14. A method for registering electronic control unit (ECU) critical information of a telematics-equipped vehicle with a telematics service provider (TSP) call center, the method comprising:
communicating, by a telematics unit, with an ECU of the telematics-equipped vehicle to obtain ECU critical information (ECI) corresponding to the ECU, wherein the ECI obtained by each telematics unit is encrypted;
verifying, by the telematics unit, the integrity of the obtained encrypted ECI, wherein the verifying further comprises:
obtaining an encrypted hash function result corresponding to contents of the encrypted ECI obtained by the telematics unit,
decrypting the obtained encrypted ECI, performing a hash function on the decrypted ECI to obtain a hash function result corresponding to the decrypted ECI, decrypting the obtained encrypted hash function result, and comparing the hash function result corresponding to the decrypted ECI with the decrypted obtained hash function result; and transmitting, by the telematics unit, the ECI to the TSP call center to facilitate stolen vehicle identification and targeted recall notifications by the TSP call center.

15. The method according to claim 14, wherein transmission of the ECI to the TSP call center is triggered by the telematics-equipped vehicle detecting a change in ECI of an ECU of the telematics-equipped vehicle.

16. The method according to claim 14, wherein the telematics units obtaining the ECI is triggered by the telematics-equipped vehicle being started.

17. The method according to claim 14, wherein transmission of the ECI to the TSP call center is encrypted.

* * * * *